April 17, 1945. J. BAILEY 2,373,939
APPARATUS FOR CONDITIONING PLASTIC MATERIAL
Filed May 13, 1942 2 Sheets-Sheet 1
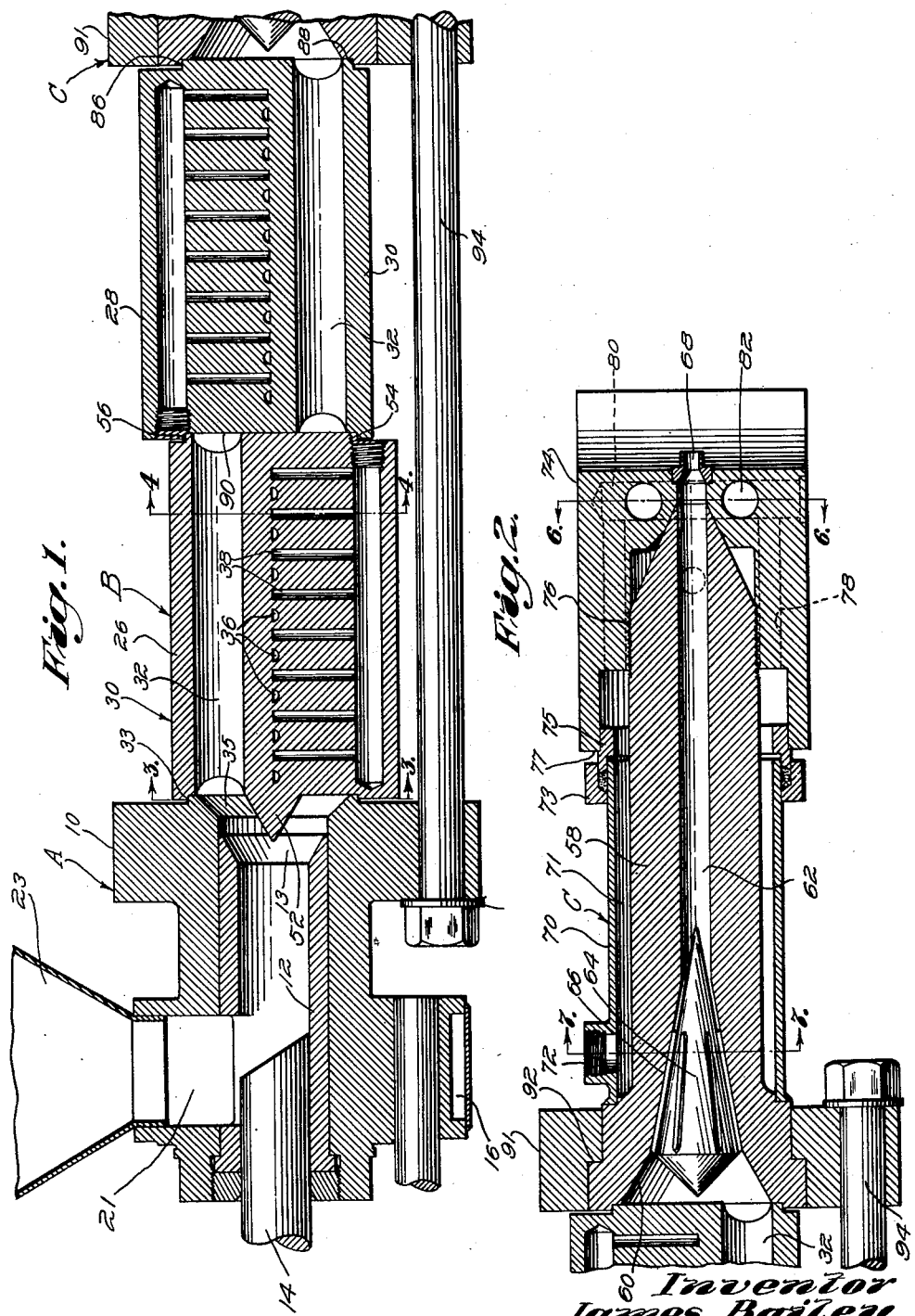
Inventor
James Bailey April 17, 1945.　　　J. BAILEY　　　2,373,939
APPARATUS FOR CONDITIONING PLASTIC MATERIAL
Filed May 13, 1942　　2 Sheets-Sheet 2
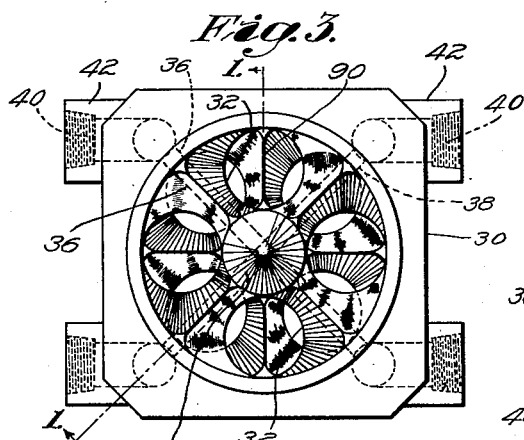
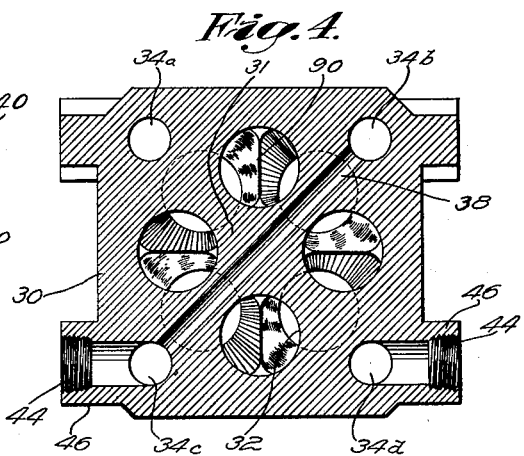
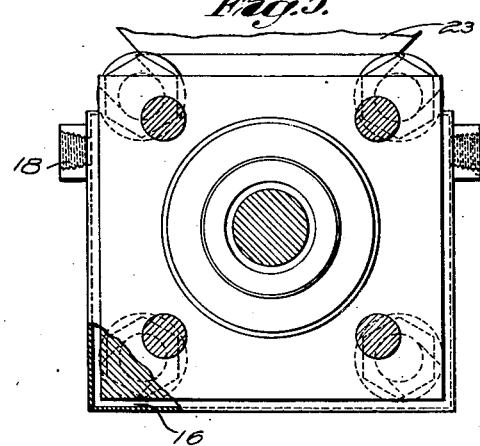
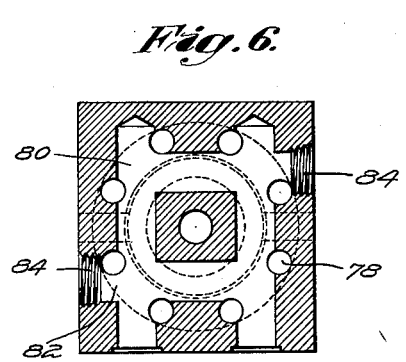
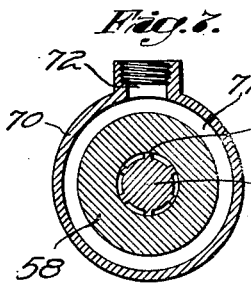
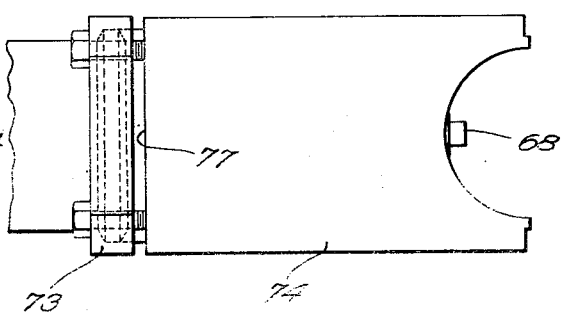
Inventor
James Bailey Patented Apr. 17, 1945

2,373,939

UNITED STATES PATENT OFFICE 2,373,939

APPARATUS FOR CONDITIONING PLASTIC MATERIAL

James Bailey, West Hartford, Conn., assignor to Plax Corporation, Hartford, Conn., a corporation of Delaware Application May 13, 1942, Serial No. 442,844

3 Claims. (Cl. 18—12)

The present invention relates to an apparatus for conditioning plastic material preparatory to shaping or molding it into a plastic product.

As is well-known, it is necessary in the shaping or molding of plastic products to preliminarily treat the plastic material by reducing it to a homogeneous heated mass of desired viscosity. It is also apparent that the rate of production depends upon how large a quantity of material may be simultaneously conditioned and how rapidly this conditioning can be accomplished.

The object of the present invention is to provide an improved apparatus for conditioning a large quantity of material and rapidly reducing it to a homogeneous mass having the required viscosity for shaping or molding into a final product.

Another object is to provide an apparatus wherein the material is conditioned in successive steps, thus permitting accurate control of the conditioning of the material, and wherein, in passing from one step to another, the material is redistributed to assure an equal distribution of the heat throughout the mass thereof.

A still further object is to provide an apparatus wherein a substantial mass of material may be simultaneously conditioned and reduced to a plasticized homogeneous mass for shaping or molding into a final product.

A still further object is to provide in an apparatus of the aforementioned type a plurality of heating units which are so constructed and disposed relative to one another that a redistribution of the plastic material will occur during passage through such units, whereby an even distribution of the heat throughout the mass is accomplished.

A still further object is to provide in an apparatus of the aforeindicated type heating units which are heated by the circulation of a heating fluid, thus permitting ready control of the temperature and wherein the unit is so constructed that the plastic material may not be forced into the circulating system, regardless of how much pressure is utilized.

A still further object is to provide in an apparatus of the aboveindicated type heating units of extremely simple construction, utilizing a minimum number of parts, and which may be conveniently assembled or disassembled.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figures 1 and 2 are sectional views of an apparatus embodying the invention herein and capable of carrying out the process; the portion of the apparatus shown in Fig. 1 being a section taken on the line 1—1 of Fig. 3 and the portion of the apparatus shown in Fig. 2 being a vertical section;

Fig. 3 is a section taken on the line 3—3 of Fig. 1;

Fig. 4 is a section taken on the line 4—4 of Fig. 1;

Fig. 5 is an end view as seen from the left of Fig. 1;

Fig. 6 is a view taken on the line 6—6 of Fig. 2;

Fig. 7 is a sectional view taken on the line 7—7 of Fig. 2; and

Fig. 8 is a plan view of the forward portion of Fig. 2.

Referring to the drawings, the process may be best understood by initially considering the disclosed apparatus which comprises, generally, means A into which granular plastic material is initially fed; said means then forcing the plastic material successively into and through a primary, double unit heater B and a secondary heater C; the material passing from the secondary heater into a shaping or molding device (not shown).

More specifically, the means A includes a body member 10 having a pressure cylinder 12 in which there is reciprocally operated, by any suitable means, a pressure plunger 14. As best seen in Figs. 1 and 5, the body member 10 is also provided with a substantially U-shaped channel 16 surrounding the sides and base thereof and having an inlet 18 and outlet 20 to permit the circulation of a heating fluid. Extending vertically from the cylinder 12 is a throat 21 having mounted in its upper end a funnel 23 to receive granular plastic material and gravity feed it into the path of the plunger 14. As the plunger moves forwardly, it forces the material through the flared end 13 of the pressure cylinder 12 and into the primary heater B.

The primary heater B comprises successive heating units or sections 26 and 28 of substantially identical construction; each unit or section having a rectangular body member 30 of substantial mass. Arranged within each body member are four heating passages 32 which extend longitudinally throughout the length of the unit and are of substantial cross sectional area, thereby being capable of holding a large mass of material. In forming the passages 32, their axial centers are circumferentially spaced ninety degrees apart at equi-radial distance from the center of the member 30, thus disposing them about a substantially solid core 31 constituting the center of the body member 30.

To heat the surfaces of the heating passages 32, each unit includes an oil circulation system having four longitudinally extending main passages 34a to 34d arranged with their axial centers circumferentially spaced ninety degrees apart at equi-radial distance from the center of the member 30; this radial distance being greater than the radial distance the heating passages 32 are spaced from the center of member 30, thus disposing the main circulation passages externally of the heating passages. To heat the central core 31 of member 30, the diagonally opposite top passage 34a and bottom passage 34d are interconnected by spaced passages 36 extending diagonally through the core, and the diagonally opposite top passage 34b and bottom passage 34c are interconnected by passages 38 also extending diagonally through the core intermediate of the passages 36. The circulation system is completed by connecting the respective ends of the top main passages 34a, 34b adjacent the feed means A to inlets 40 extending laterally through a lug 42 projecting from the member 30 (see Fig. 3) and the respective ends of the bottom main passages 34c and 34d remote from the feed means A (see Fig. 4) to an outlet 44 extending laterally through a lug 46 projecting from the number 30.

With the circulation system so arranged, the heating fluid may be pumped into the inlets 42 to flood the top main passages, whereupon oil will then flow through the diagonal passage to the bottom main passages and be withdrawn through the outlet. In this way, the heat is well distributed throughout the entire body member 30; the main passages 34a to 34d heating the member exterior of passages 32 and the diagonal passages 36 and 38 heating the core 31. As the member 30 is of substantial mass, once it has been brought to a desired temperature it will tend to maintain that temperature, and any tendency to vary therefrom can be readily compensated for by changing the temperature of the oil or the rapidity of flow through the passages. It will also be noted that the entire oil circulation system is separated from the heating passages 30 by solid metal, preventing the forcing of plastic material into the circulation system and clogging same.

With the heater units 26 and 28 so constructed, the first unit 26 is provided with a collar 33 for alignment with a throat 35 provided on the member A, whereby the heating passages 32 will be aligned with the pressure cylinder flaring outlet 13. As a result, when granular material is forced forwardly by the plunger 14, it will enter into the heating passages 32, and, to more properly direct it, the unit 26 may be provided adjacent the pressure cylinder with a funnel-like abutment 52 which spreads the material as it leaves the cylinder 12. To align the second unit 28 with the first unit 26, the forward end of the latter is provided with a throat 54 receivable within a collar 56 in the adjacent end of the second heating unit 28.

As previously stated, the second unit is of like construction to the first unit. This unit differs, however, in the arrangement of the parts in that the heating passages 32 are arranged out of phase with those of the first unit; in the embodiment shown their axial centers being offset from the axial centers of the heating passages of the first unit by a forty-five degree angle. The purpose of offsetting the heating passages of the two successive units may be best understood by considering so much of the process as the apparatus now described is capable of performing.

In accordance with the process herein, there is initially formed a plurality of streams of plastic material; this being accomplished in the apparatus disclosed by feeding the plastic from the pressure cylinder 12 into the four heating passages 32 of the first heating unit 26. As previously indicated, these passages are of substantial cross section, and thus a considerable mass of material can be received by each passage and the streams will be of substantial cross sectional area. The streams of plastic material are then heated; this being accomplished by circulating hot oil through the oil circulation system of the heating units 26. Obviously the particles of the stream directly engaging the heating passage walls will heat faster than those in the center, and coring may result. To destroy such cores and to change the position of the plastic particles relative to the heating surface, the streams initially formed are next divided into two directed away from one another; this being accomplished by the streams emitting from the first heating unit 26 abutting against the end wall portions 90 of the second heating unit 28 intermediate of the heating passages (see Figs. 3 and 4). After this division occurs, each half stream will then flow into a heating passage of the second unit and there merge with the half stream from the adjacent heating section of the first passage to re-form a plurality of full streams equal in number to the streams initially formed.

As will be apparent, upon the division of the initial streams in passing from the first heating unit, if any coring has resulted, such a core will now be destroyed, and the particles which were central of the initial full stream and remote from the heating surfaces will now be the outer surface of the second full stream and adjacent the walls of the heating passage. In this way, heat is evenly distributed throughout the entire mass of plastic, and, in addition, the plastic is brought into a more homogeneous state. The second set of full streams is then maintained until the material is at proper temperature and proper viscosity, whereupon the second set of streams merge together; this occurring as they leave the second heating unit 28 and enter into the secondary heating unit C.

The primary function of the secondary heating unit C is to reduce the plastic to a stream having a cross sectional area which may be readily forced into the final shaping device; heat being applied merely to maintain the plastic at the temperature and viscosity it had attained upon leaving the primary heater B.

In order to accomplish the foregoing, the heating unit C comprises a cylinder 58 having an enlarged funnel-shaped entrance passage 60 into which the streams emitted from the second heater unit 28 emerge. The passage 60 tapers into an elongated cylindrical passage 62; this passage terminating in a reduced outlet portion 68 which may be connected to a shaping device, as, for example, an extrusion head (not shown). Located within the tapering entrance passage 60 is a spreader 64 of the "torpedo type" having radially extending fins 66 which space the "torpedo" body from the walls of the passage to permit flow of the plastic into the elongated portion 62.

In order to maintain the cylinder 58 heated, there is arranged thereon a jacket 70 having an oil inlet 72. The jacket 70 surrounds the cylinder 58 for a substantial portion of its length to define therewith an annular oil passage 71; the jacket being connected at its forward end to the collared end 77 of an extrusion head supporting member 74 by a slip joint comprising a ring 73 and sleeve 75. The member 74 is threaded onto the cylinder head, as at 76, and to permit oil circulation therethrough and maintain the support at desired temperature, there are provided a plurality of longitudinally extending, circumferentially spaced passages 78 leading from the passage 71. The passages 78 terminate in intersecting horizontal and vertical passages 80 and 82, which passages surround the reduced outlet portion 68 of the cylindrical passage 62. The horizontal passages 80 are provided with suitable outlets 84 whereby oil, after entering the inlet 72, will flood the passage 71 and then flow forwardly through the extrusion head support and be withdrawn through the outlets 84.

In order to maintain the member C in proper alignment with the primary heating unit B, the flared passage 60 may be provided with a collar 86 for receiving a throat 88 provided on the adjacent end of the heating unit 28. In order to maintain all of the heating units in rigid alignment, there may be provided on the secondary heater C a ring 91 having a step connection 92 with the cylinder 58; this ring being interconnected with the feeding means A by a plurality of tie rods 94. It will also be noted that due to this construction the parts may be readily assembled and disassembled and any plastic which may leak through the joints will merely pass to atmosphere.

Considering now the part the secondary heater plays in carrying out the process, it will be seen that upon the four streams of plastic emerging from the second heating unit 28, they will converge and intermingle within the flared entrance passage 60 of the secondary unit C. The plastic is now properly conditioned, but must be reduced to a proper size injection stream. To do this, the plastic is forced past the spreader 64, whereupon the thin sections then formed will converge into an injection stream within the elongated passage 62, from which passage it may be readily fed into the extrusion head or other shaping device.

It will also be appreciated that the cross sectional area of the passage 62 is relatively small; in effect being substantially smaller than any one of the passages through the primary heating unit. Because of this, there will always be a substantial mass of conditioned plastic leaving the primary heater B and available for rapidly filling the passage 62. Because of this, the plastic may be rapidly drawn from this passage and, due to the substantial mass of available plastic, rapidly replaced, thus substantially increasing the rate of production of the device.

Although the apparatus disclosed includes a feeding means of the plunger-operated type, it is obvious that the heating units could be utilized in conjunction with any other type of feeding means. It is likewise apparent that in carrying out the process or in using the apparatus, a plastic material may be used which has been preliminarily treated and is in a plasticized condition prior to its entering the heating units. Likewise, although the apparatus has been described with reference to the specific location and number of heating passages and the specific location of the oil circulating system, it will be appreciated that the distribution and number of the heating passages and the circulating system may be varied.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an apparatus for preparing plastic material for final shaping or molding, a plastic material feeding means having a discharge opening through which the plastic material is forced, and a heater comprising two sections each composed of an integral one-piece metal body member of substantial mass, each of said sections having a plurality of passages extending throughout the length thereof and angularly spaced apart about and at equi-radial distances from the center of the section, one of said sections being in abutting relation to said feeding means so that the passages therein receive the material from said discharge opening, and said sections being in end to end abutting relation with the centers of the passages of the second section angularly spaced between the centers of the passages of the first section, each of said sections further having an oil circulating system comprising longitudinally extending passages located between and terminating short of the ends of the section and a plurality of radially extending passages interconnecting said longitudinally extending passages, the metal of each section between the first mentioned passages and the passages comprising the oil circulating system being unbroken and continuous.

2. In an apparatus for preparing plastic material for final shaping or molding, a plastic material feeding means having a discharge opening through which the plastic material is forced, and a heater comprising two sections each composed of an integral one-piece metal body member of substantial mass, each of said sections having a plurality of passages extending throughout the length thereof and angularly spaced apart about and at equi-radial distances from the center of the section, one of said sections being in abutting relation to said feeding means so that the passages therein receive the material from said discharge opening, and said sections being in end to end abutting relation with the centers of the passages of the second section angularly spaced between the centers of the passages of the first section, each of said sections further having an oil circulating system comprising longitudinally extending main fluid passages located between and terminating short of the ends of the section and disposed at opposite sides of the center thereof at a greater distance than said first mentioned passages, and a plurality of passages interconnecting said main passages and extending radially through the center of the section, the metal of each section between the first mentioned passages and the passages comprising the oil circulating system being unbroken and continuous.

3. In an apparatus for preparing plastic material for final shaping or molding, a plastic material feeding means having a discharge opening through which the plastic material is forced, a heater comprising two sections each composed of an integral one-piece metal body member of substantial mass, each of said sections having a plurality of passages extending throughout the length thereof and angularly spaced apart about and at equi-radial distances from the center of the section, one of said sections being in abutting relation to said feeding means so that the passages therein receive the material from said discharge opening, and said sections being in end to end abutting relation with the centers of the passages of the second section angularly spaced between the centers of the passages of the first section, each of said sections further having an oil circulating system comprising longitudinally extending passages and a plurality of radially extending passages interconnecting said longitudinally extending passages, and a secondary heater comprising a body member following and abutting the above mentioned second section and having a passage therethrough adapted to receive the plastic material from the passages in the second section, said secondary heater having an enlarged inlet and a reduced outlet, and a spreader located in said enlarged inlet.

JAMES BAILEY.